Figure 12:

(No Model.) 2 Sheets—Sheet 1.
J. PAULUS.
CAP FOR EXPLODING DYNAMITE.
No. 323,524. Patented Aug. 4, 1885.
Fig. 1.     Fig. 2.     Fig. 3.
  
Fig. 4.   Fig. 5.   Fig. 6.   Fig. 7.
   
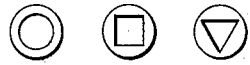
Fig. 8.   Fig. 9.   Fig. 10.   Fig. 11.
   
Witnesses,
Arthur S. Brown.
Norris A. Clark
Inventor,
Jacob Paulus,
by Burke Fraser & Connett,
Attorneys.

(No Model.) 2 Sheets—Sheet 2.

J. PAULUS.
CAP FOR EXPLODING DYNAMITE.

No. 323,524. Patented Aug. 4, 1885.

Witnesses
Arthur S. Brown
Norris A. Clark

Inventor
Jacob Paulus
by Burke Fraser and Cornett
Attorneys

United States Patent Office.

JACOB PAULUS, OF BERLIN, GERMANY.

CAP FOR EXPLODING DYNAMITE.

SPECIFICATION forming part of Letters Patent No. 323,524, dated August 4, 1885.

Application filed May 7, 1885. (No model.)

*To all whom it may concern:*

Be it known that I, JACOB PAULUS, of the city of Berlin, in the Kingdom of Prussia and German Empire, have invented certain new and useful Improvements in Caps or Apparatus for Exploding Dynamite, of which the following is a specification.

My invention relates to improvements in the manufacture of blasting-caps for exploding dynamite, nitro-benzole, gun-cotton, and other blasting compounds, the object of which said improvements is to insure the explosion and increase the explosive force of such said blasting-caps whether they are employed for exploding dynamite, nitro benzole, gun-cotton, or for other purposes.

By means of my improvements I am enabled to obtain the above-mentioned results in a higher or lesser degree, according to the purpose which it is desired to attain.

My improvements apply equally to ordinary blasting-caps and to such provided with an inner capsule.

The accompanying drawings show in a number of representations those improvements which I desire to protect by Letters Patent. The improvements refer as much to the construction of the caps as to the absolute perfection of the charge and the method of filling the same into the cap, as the charge is only then able to fulfill its purpose surely and with the highest effect when the explosive mass is in a perfectly dry condition and when it completely fills out the hollow space of the double cap as a compact body which cannot be affected by rapid or violent motion or shocks to which the caps may be subjected.

Besides insuring the absolute safety of the charge and attaining the highest effect at the explosion of the cap, it is the object of all these improvements to direct the force of the explosion downward, or, in other words, in the direction of the longitudinal axis of the explosive mass which the said cap is intended to explode. It is, however, possible, if the purpose requires it, to divide the exploding-power in such manner that the same is able to act with great effect in a lateral direction. A few small holes or perforations of round, angular, or other appropriate form in the side walls of the cap within the limits of the charge would produce the desired effect, and would be of special importance in cases where fluid explosives are employed.

The figures in the accompanying drawings represent the different constructions of the cap according to the degree of the force of explosion required for the purpose and with the object before mentioned.

Figure 13:
Figure 14:
Figure 19:
Figure 15:
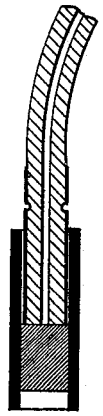
Figure 16:
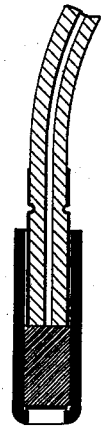
Figure 17:
Figure 18:
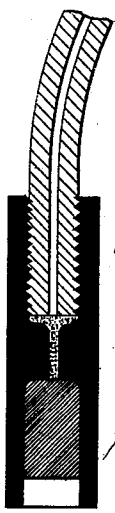

Figure 1 represents a cap the bottom of which is so weakened that the same only acts as a protective cover for the charge. Fig. 2 shows a cap of which the corner, formed by the bottom and the side walls, is beveled off to such an extent that only thin annular connection between bottom and side wall remains. Fig. 3 shows the weakened parts of the bottom, which are produced by cuts or incisions in the inner or outer surface of the said bottom. In Fig. 4 the bottom is either totally or to the greater part punched out or removed, thus only leaving a narrow rim or such parts as were left by the respective cutting, which remaining parts are intended to receive the plate or cover. Figs. 5, 6, and 7 show a cap perfectly bottomless, Fig. 5 showing the blank space, whereas Figs. 6 and 7 show the same closed up by an inserted cap or covered with a suitable cover. Figs. 8, 9, 10, and 11 represent caps with an outer and an inner capsule, the latter of which is provided with a round or otherwise formed opening or aperture in the bottom, of appropriate size, whereby the inner cap is arranged either a few millimeters above the bottom of the outer cap or shell or closely resting upon the same, the hollow space between being completely filled out with hard-pressed dry explosive matter, which thus forms a hard, solid body. Fig. 12 is a cap without bottom, as shown in Fig. 4, but surrounded by a mantle or shell. Figs. 13 and 14 show caps with a capsule and an outer mantle or shell for the purpose of strengthening the walls of the said caps. Figs. 15, 16, and 17 show caps, with or without bottom, with walls of considerable thickness, that the nipping in of the upper uncharged portion of the walls is no longer admissible, and so that (as shown by Figs. 13 and 14) for the reception of the quick-match the employment of a thin tube of soft metal, which may either be pressed or screwed into the cap or shell, is required; or the upper part of the cap may be provided with a screw-thread for the reception of the quick-match. Figs. 18 and 19 are caps with walls of considerable thickness, the upper part, $a$, of which is provided with screw-threads for the quick-match, whereas the lower part, $\beta$, of the wall of the cap either serves direct for the reception of the explosive matter, Fig. 18, or receives an inner capsule, Fig. 19, which latter is provided with a vent and is placed into the cap in inverted position—i. e., with the open part downward. The smaller borings $b$, which serve as igniting canals or channels, should, before inserting the quick-match, be filled up with loose gunpowder or some other suitable explosive or combustible matter of a secondary nature, whereby the effect of the shot will be absolutely secured.

In order to protect the outer or inner walls of the cap or caps of the shell or shells from the influence of acids, the same can be varnished with a suitable varnish or other equivalent, or be provided with a suitable coating of non-oxidizing metal or other matter by means of electricity or galvanic action, or in other suitable manner.

It is evident that in order to attain the object before described, and without departing from the principle of my invention, I can, from the various constructions shown, apply and carry out a further number of combinations of the parts of the said blasting-caps.

Having now particularly described and ascertained the nature of my said invention and in what manner the same is to be performed, I declare that what I claim is—

1. A blasting-cap adapted for downward firing, having its bottom weakened, substantially as set forth, in combination with a metallic cylindrical re-enforcing mantle or shell open at both ends, which is located at the lower end of the cap, substantially as set forth.

2. A blasting-cap which contains the explosive, having its bottom integral with the body thereof, said bottom being weakened by being partially cut away, substantially as set forth, whereby a downward explosion is attained.

In witness whereof I have hereunto signed my name in the presence of two subscribing witnesses.

JACOB PAULUS.

Witnesses:
ANTHONY STEFFER,
B. ROI.